March 9, 1965   J. O. ROESER   3,172,971
SNAP-ACTION ELECTRICAL SWITCH MECHANISM
Original Filed Feb. 8, 1960   3 Sheets-Sheet 1
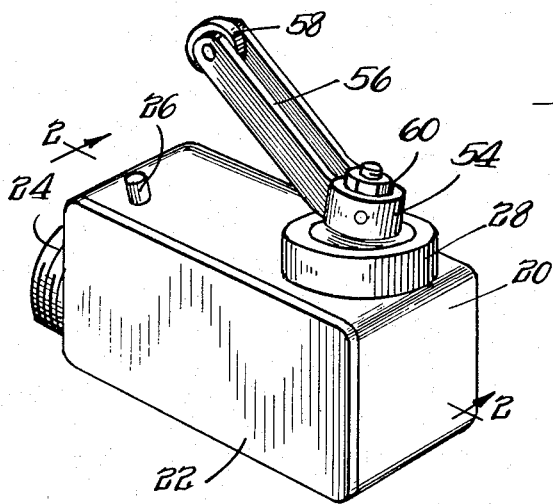
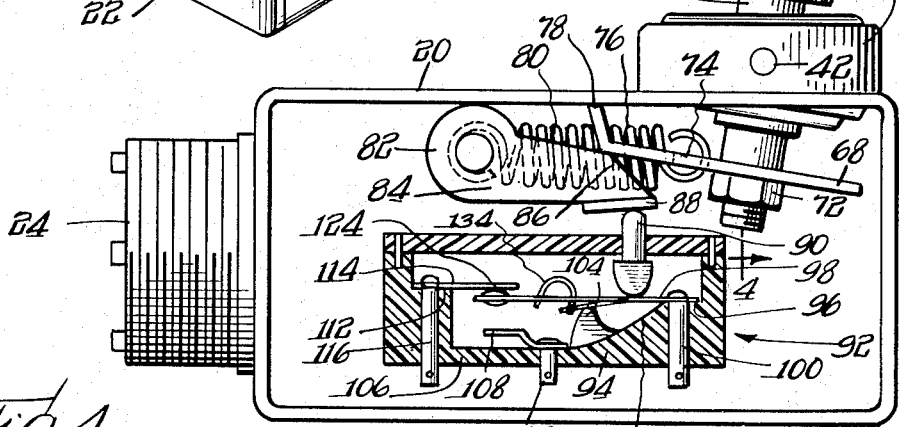
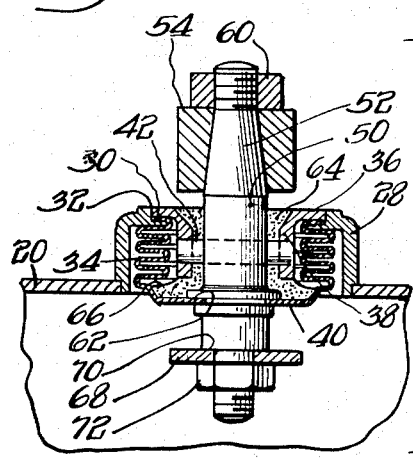
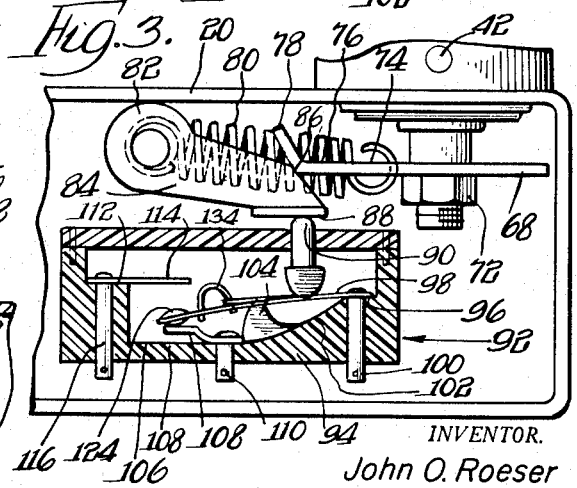
INVENTOR.
John O. Roeser
BY

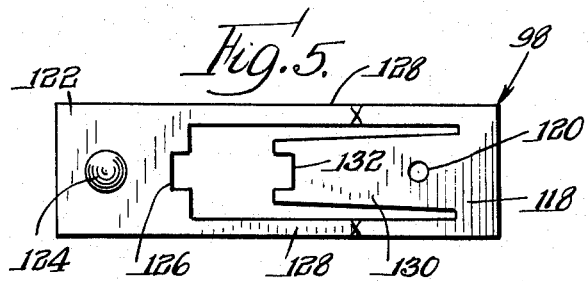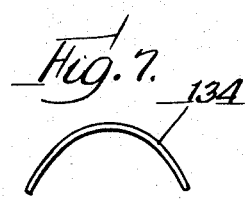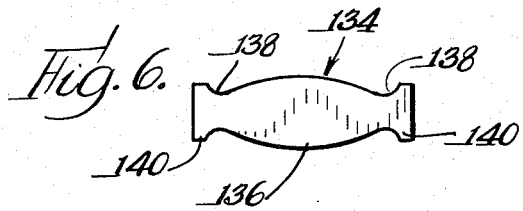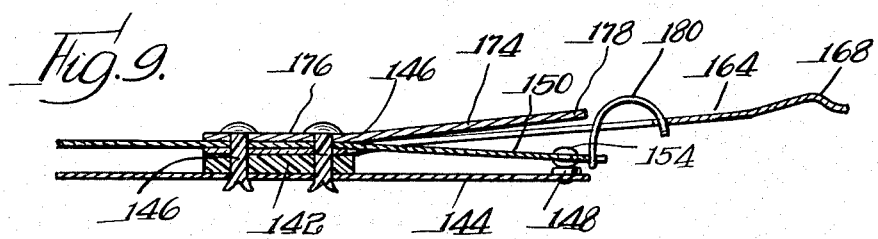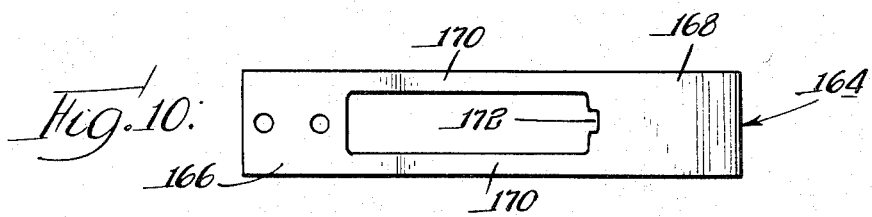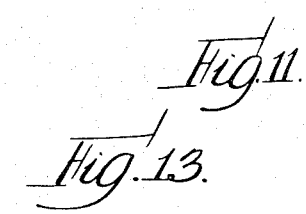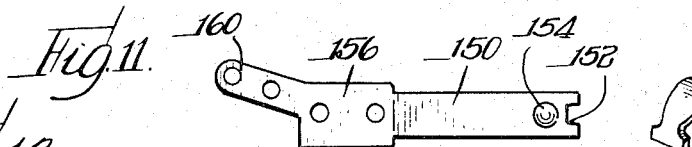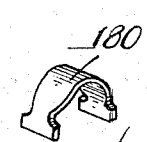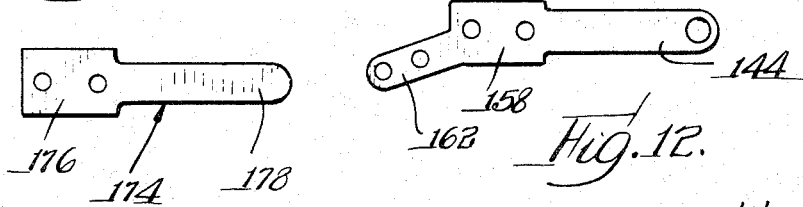

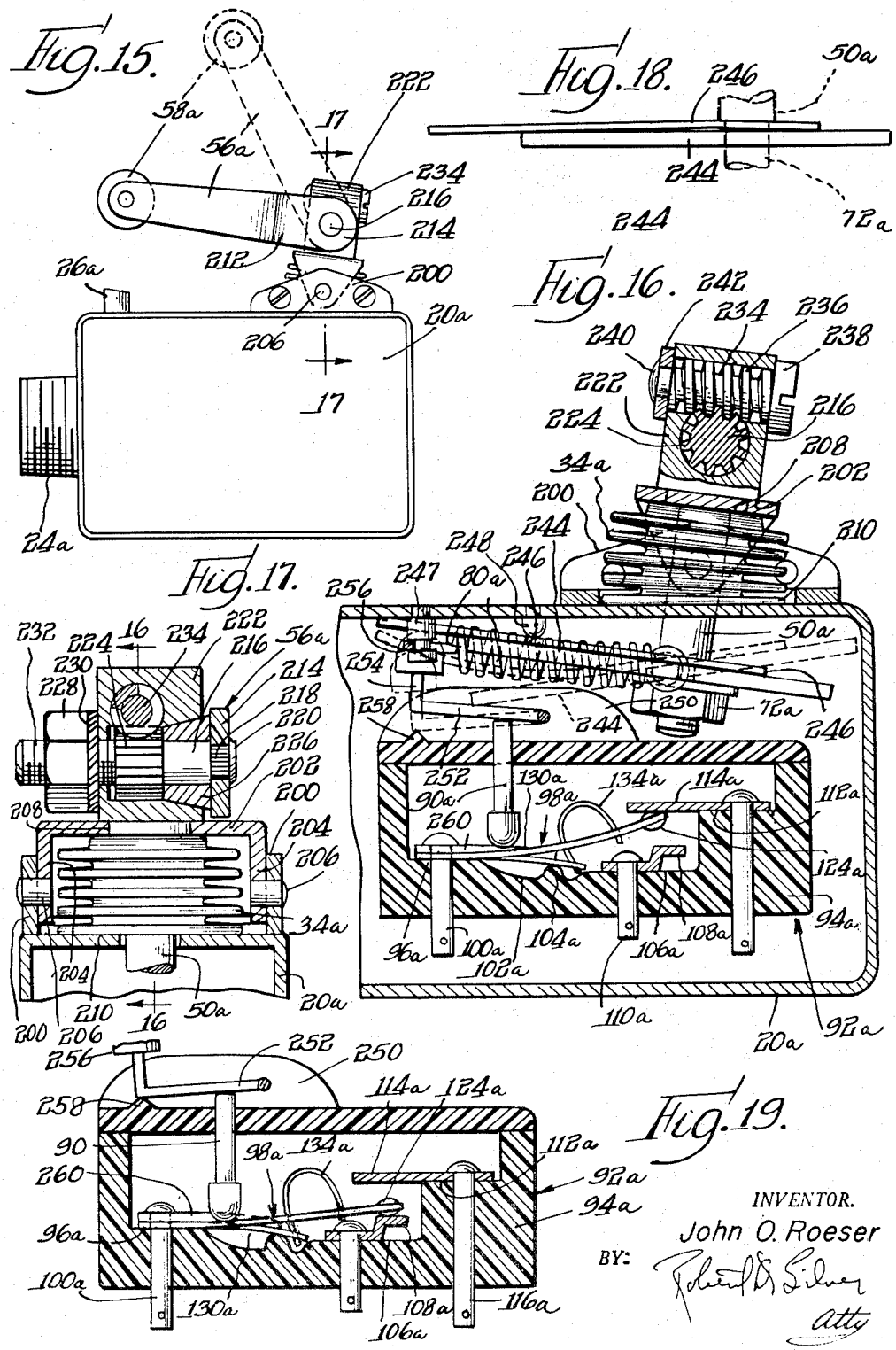

United States Patent Office 3,172,971
Patented Mar. 9, 1965

3,172,971
SNAP-ACTION ELECTRICAL SWITCH MECHANISM
John O. Roeser, Park Ridge, Ill., assignor to Illinois Tool Works Inc., Chicago, Ill., a corporation of Delaware
Original application Feb. 8, 1960, Ser. No. 7,484, now Patent No. 3,105,885, dated Oct. 1, 1963. Divided and this application June 3, 1963, Ser. No. 284,874
5 Claims. (Cl. 200—67)

This is a division of application Serial No. 7,484, filed February 8, 1960, now U.S. Patent No. 3,105,885 which issued on October 1, 1963, which in turn was a continuation-in-part of application Serial No. 589,714, filed June 6, 1956, which is now abandoned. This invention is concerned with an electrical switch, more particularly the type of electrical snap switch having a low travel and actuated by a relatively very small movement of an operating member.

Low travel switch mechanisms find wide use in industry and in aircraft. In many installations, particularly those in aircraft, the entire mechanism must be sealed. Prior low travel switch mechanisms with which I am familiar have had seals which have been prohibitively expensive, or which have not had satisfactorily long service life or did not offer a true hermetic seal. In addition, the springs used in such switches have not been entirely satisfactory. Such springs often comprise leaf springs deformed more or less to C-shape for effecting an overcenter snap action. Such springs have had holes in them for receiving mounting parts, thus weakening the springs, or have had sharp bends therein, or have had to be installed in cooperation with expensive mounting parts. Sharp bends in leaf springs obviously are to be avoided, since sharp bends cannot be made after tempering of the metal without running a substantial risk of fracture, and tempering of sheet metal springs after such bending is likely to lead to warpage of the springs.

Accordingly, it is an object of this invention to provide an improved low travel switch mechanism.

It is a further object of the invention to provide an improved sealing structure in such a switch mechanism.

In addition, it is an object of this invention to provide an improved leaf spring for operating an overcenter low travel switch mechanism, which spring is readily cooperable with stamped sheet metal parts, and which has no weakening apertures or sharp bends therein.

Another object is to provide a sealed control switch adapted for operation by movement relative to the switch of external structure and having an improved construction which provides for adjustment of the switch to respond to different positions of external structure relative to the switch and which assures precise operation of the switch for every position of adjustment.

Another object of the invention is to provide an enclosed low travel control switch having an improved construction which provides for extremely precise and reliable operation of the switch in response to location of external structure in a critical control position relative to the switch, which position can be infinitely and precisely adjusted to any desired location within a wide range of positions relative to the switch.

Another object is to provide a low travel control switch isolated from the external environment in a housing and operated by new and improved control structure supported on the housing and having an improved construction which assures precise and reliable operation of the switch in response to movement of external structure into a critical operating position relative to the switch, while at the same time providing for infinite adjustment of the control structure through a wide range of movement to vary the critical position relative to the switch in which external structure will produce the desired precise operation of the switch.

A further object is to provide an improved control switch, as recited in the preceding objects, which has an improved construction that provides at once for sealing the switch within a housing and for adjustment of the switch through operation of externally accessible adjusting elements to respond with great accuracy and dependability to the location of external structure in different control positions relative to the switch.

It is further an object of this invention to provide a spring for a switch mechanism as in the preceding paragraph wherein the spring has improved spring characteristics.

Other and further objects and advantages of the present invention will be apparent from the following description when taken in connection with the accompanying drawings wherein:

FIG. 1 is a perspective view of the outside of a case of a switch mechanism constructed in accordance with the principles of this invention;

FIG. 2 is a longitudinal sectional view through the switch mechanism as taken along the line 2—2 in FIG. 1;

FIG. 3 is a view similar to FIG. 2 showing the parts in a different position of operation;

FIG. 4 is a fragmentary view partially in substantially vertical section as taken along the line 4—4 in FIG. 2;

FIG. 5 is a plan view of the switch blade with which the spring cooperates;

FIG. 6 is a plan view of the novel spring;

FIG. 7 is a side view of the spring as prestressed;

FIG. 8 is a side view of the spring susbtantially as installed;

FIG. 9 is a side view of a modified form of switch;

FIG. 10 is a top view of the switch actuator of FIG. 9;

FIG. 11 is a top view of the movable switch blade;

FIG. 12 is a plan view of the fixed switch blade;

FIG. 13 is a plan view of the stop for the movable switch blade;

FIG. 14 is a perspective view of the spring;

FIG. 15 is a side view of the outside of a modified switch mechanism;

FIG. 16 is a fragmentary longitudinal sectional view of the modification of FIG. 15 as taken along the line 16—16 in FIG. 17;

FIG. 17 is a fragmentary cross sectional view along the line 17—17 in FIG. 15;

FIG. 18 is a detail view of a switch actuating part; and

FIG. 19 is a longitudinal sectional view showing the switch parts in a different position of operation.

Referring now in greater particularity to the drawings, and first to FIGS. 1–4, there is shown a box-like housing or case 20 open on one side and having a cover 22 suitably sealed in place thereon. An electrical connector 24 is provided at one end of the housing or case, and is provided with external screw treads, as is well known in the art. A tubulation 26 is provided on the housing for evacuation of air, this tubulation is being sealed following evacuation, all as is well known.

An annular ring or boss 28 is sealed to the housing near one end thereof, and is provided with a radially inwardly extending annular flange 30 (FIG. 4). The flange is provided with a seat 32 on the top surface thereof. A Sylphon bellows 34 depends from the flange 30. The uppermost corrugation of the bellows embraces the flange and is solder sealed thereto along the top of the flange.

The flange 36 of a tubular member or bushing 38 seats against the top corrugation of the bellows adjacent the seat 32 and is soldered or brazed thereto. The tubular body or shank of the member or bushing 38 depends within the bellows, but terminates short of the closed end 40 of the bellows. A cross pin 42 is held by the tubular body of the bushing 38 and a rocker arm or operating member 50 is pivoted intermediate its ends on the cross pin 42, and comprises an operating lever extending through the wall of the housing 20.

The rocker arm or operating member is provided adjacent its upper end with a tapered portion 52 receiving the collar 54 of an external lever arm 56. The lever arm 56 is made of strap material and comprises a pair of parallel strips having a roller 58 rollingly secured on a pin between the tips thereof. A nut 60 is threaded on the upper end of the rocker arm or operating member and clamps the external lever arm in proper position.

The closed lower end 40 of the bellows is provided with a central aperture seating against a shoulder 62 on the rocker arm or operating member 50. The bellows is sealed to the rocker arm or operating member at this position by means of solder, brazing or some other suitable means. Further to insure proper seal, to prevent entrance of moisture, dirt, and other foreign matter to the inside of the bellows, there is provided a mass of resilient material 64. This mass of resilient material is positioned between the bushing or member 38 and the rocker arm or operating member 50. However, it is terminated short of the corrugations of the bellows as is indicated at 66. This material preferably is a silicone rubber, or some other suitable material such as sponge rubber granules in a resilient setting vehicle. The ring or boss 28 is solder sealed to the housing and to the bellows, and the bellows is solder sealed to the rocker arm or operating member, the bellows and rocker arm or operating member further being sealed by the silicone rubber or other material 64. A flexible or rocking operating member thus is provided extending interiorly and exteriorly of the housing without allowing the entrance of air or any other substance into the housing.

A polygonal plate 68 is secured against a shoulder 70 adjacent the opposite end of the rocker arm or operating member 50 by means of a nut 72. This polygonal plate has a pair of lateral shoulders 74 and a central tongue 76 extending therefrom and having an upwardly directed tip 78. A pair of springs 80 lying on opposite sides of the tongue 76 is stretched between suitable anchor holes in the shoulders 74 and a pin 82 extending from the rear wall of the housing or case 20. This normally holds the operating lever or rocker arm 50 and the external lever 52 in the position shown in FIGS. 1 and 2, but allows them to move to the position shown in FIG. 3.

A cam follower or operating arm 84 is pivotally mounted on the pin 82 and is provided with a cam surface 86 engageable with the tongue 76 and upturned tip 78 thereof. The cam member 84 also is provided at its outer end with a horizontal plate 88 engaging a switch operating button 90 as will be explained hereinafter.

The switch mechanism, generally designated by the numeral 92, is mounted within the housing or case 20, as by being suitably pinned or bonded against one surface thereof. The switch mechanism includes a plastic case 94 having a shelf 96 near one end thereof on which a switch blade 98 is secured in known manner by the rivet-like terminal 100. The case slopes downhill therefrom as at 102, having a central raised protuberance or hill 104, to a floor 106. A fixed switch contact 108 is mounted on the floor by means of a terminal 110. A further shelf 112 is provided, and a second fixed switch contact 114 is mounted thereon by means of a terminal 116.

The configuration of the switch blade 98 will be seen more particularly with regard to FIG. 5. The switch blade is of generally rectangular outline, including an anchoring end 118 having an aperture 120 therein for receipt of the terminal 100. At the opposite end there is a contact carrying portion 122 carrying the button contacts 124 engageable with the fixed contacts. The contact carrying portion 122 is provided along its inner edge with a rectangular notch or female slot 126. The anchoring end 118 and contact carrying end 122 are interconnected by longitudinally extending legs 128 along the opposite lateral edges of the blade. A central tongue 130 extends longitudinally from the anchoring end toward the contact carrying portion, and is permanently bent downwardly so as to rest firmly against the hill or projection 104. The outer end of the tongue 130 is provided with a notch or female slot 132 confronting the notch or female slot 126, but spaced therefrom.

A C-shaped overcenter spring 134 extends between the notches or female slots 126 and 132 and normally holds the contact 124 up against the fixed contact 114. The shape of the C-shaped spring is of considerable importance, and is shown in outline in FIG. 6. The spring is provided with a central enlarged body portion 136 tapering toward the opposite ends to form necks 138 of restricted width. Tabs 140 immediately past the necks extend laterally outwardly therefrom. The spring 134 normally is prestressed to a shallow C-shaped configuration as in FIG. 7. The spring then is inserted with the necks or restricted portions 138 in the notches or female slots 126 and 132. This causes compression or deformation of the spring to the shape shown in FIG. 8, the spring thereby being under compression.

The actuating button is bifurcated and engages the legs 128 approximately at the position indicated by the X's in FIG. 5. Thus, when the button 90 is forced down by the plate 88, it forces the legs 128 down until the switch blade 98 overcenters. The spring 134 then snaps the contacts 124 from the fixed contact 114 to the fixed contact 108. When the button 90 is released the inherent resiliency of the blade 98 tends to return it toward the raised position, and this tendency is completed by the force of the spring 134 upon overcentering. It will be apparent that the spacing between certain of the parts, notably the fixed contacts 108 and 114, has been exaggerated for purposes of illustration.

It will be observed that the C-shaped actuating spring in this instance is devoid of weakening apertures and sharp bends. The enlargement of the central body of the spring provides more metal at the point of greatest strain, and also provides an improved spring action.

The principles of the invention are applicable also to a single throw snap switch as is illustrated in FIGS. 9–14. More specifically, there is provided an insulating base 142 having a fixed contact blade 144 mounted therebeneath by means of plastic rivets 146. The blade is provided adjacent its outer end with a fixed contact 148.

On top of the insulating base 142 there is provided a moving switch blade 150, also held by the plastic rivets 146. The switch blade 150 is provided at its outer end with a notch or female slot 152, and immediately adjacent thereto there is provided a contact button 154. The switch blade 150 is provided with a mounting base 156, and the fixed switch blade or contact 144 similarly is provided with a body portion 158, both body portions being apertured for receipt of the rivets 146. A tail or terminal 160 extends obliquely in one direction from the body portion 156, while a similar tail or terminal 162 extends obliquely or diagonally in the opposite direction from the body 158.

A flexible actuator 164 of rectangular outline is provided with an anchor or body portion 166 at one end thereof, being apertured for receipt of the rivets 146, and being interposed between the switch blade base 156 and insulating base 142. There is an operating portion 168 at the opposite end, joined to the anchor by means of longitudinally extending legs 170 lying on opposite sides of the blade 150. There is provided a notch or female slot 172 confronting the notch or female slot 152. The operating portion 168 of the actuating member is deformed slightly upwardly for engagement with a suitable button or other member for moving the actuating member downwardly.

The switch of FIGS. 9–14 is completed by a fixed stop 174 comprising a base 176 and a blade 178. The base is apertured for receipt of the rivets 146, and the blade 178 is bent slightly upwardly. A C-shaped spring 180 similar in configuration to that previously disclosed is mounted between the notches or female slots 152 and 172. The actuating lever 164 normally is bent slightly upwardly and is held against the fixed stop by the spring 180. When the actuating lever is pushed down, the spring 180 overcenters, and the switch blade 150 is snapped up, movement being limited by the fixed stop 174. Release of the operating lever causes it to tend to return to its raised position by virtue of its inherent resiliency, and overcentering of the spring 180 snaps the switch blade down and the actuating lever up to the positions shown in FIG. 9. Actuator 164 may have no bias so that the switch will remain in either of its extreme positions.

It will be apparent that the embodiment of the invention as shown in FIGS. 9–14 could be used in a sealed housing such as has been disclosed with regard to FIGS. 1–3.

A modification of the invention is shown in FIGS. 15–19. In this modification, many of the parts are equivalent to, or identical with parts previously shown and described. Accordingly, similar numerals are utilized to identify similar parts, such numerals having the suffix $a$ added thereto. Thus, the switch includes the box-like housing or case 20a having a cover sealed thereon, and having an electrical connector 24a at one end thereof. The tubulation 26a again is provided for exhausting air from the housing or case.

There is somewhat of a modification in the sealing of the rocker arm or operating member 50a to the case or housing. A pair of flanges 200 upstands from the housing or case 20a in spaced apart relation, and a yoke 202 is secured to the rocker arm 50a and has a pair of depending arms 204 pivotally secured to the flanges by a pair of pivot pins 206. The Sylphon bellows 34a is sealed to the rocker arm or actuating rod 50a at 208 where the rocker arm passes through the yoke. The bellows also is sealed to the top of the case or housing 20a at 210.

The external lever arm 56a comprises a single strip of sheet material rotatably carrying a roller 58a at the outer end thereof. The major portion of the lever arm 56a is aligned with the center arm of the rocker arm 50a, but the lever arm is provided with an offset portion 212 whereby a mounting base 214 of the lever arm fits at one side of the rocker arm. This base 214 of the lever arm is secured to a short cross shaft 216 by means of a splined reduced end 218 on the cross shaft fitting through the base 214, the reduced end being peened over as at 220.

The rocker arm 50a is provided at its upper end with an enlargement or housing 222, and the cross shaft 216 extends through this enlargement. The cross shaft is provided intermediate its ends with a splined portion 224, and a tapered locking bushing 226 is trapped between the splined portion 224 and the base 214 of the lever arm 56a. This tapered bushing fits in a complementary tapered bore in the enlargement 222, and the cross shaft 216 on the opposite side of the splined portion 224 fits through a cylindrical bore, whereby the cross shaft is rotatably or pivotally journaled. A nut 228 and lock washer 230 are provided on the threaded outer end 232 of the cross shaft for tightly locking the cross shaft in any desired position of adjustment. Preferably, the nut 228 and lock washer 230 are of the preassembled type known as "Keps."

A worm 234 extends through the upper portion of the enlargement 222, and the thread 236 thereof engages the splined portion 224 of the cross shaft 216. The screw 234 is provided at one end with a slotted head 238, and at the other end the screw is peened over at 240 against a retaining washer 242.

Upon loosening of the nut 228 and lock washer 230, the screw 234 can be turned by a screwdriver to adjust the lever arm 56a up and down relative to the rocker arm 50a. For example, in FIG. 15 the lever is shown in solid lines in one possible position of operation, and is shown in dashed lines in another possible position of operation. When the lever arm 56a is adjusted to proper position, the nut 228 is retightened against the lock washer 230 to lock the lever arm in adjusted position.

The actuating member secured to the lower end of the rocker arm 50a is somewhat different, and comprises a rigid backup plate or arm 244 having a prestressed steel spring arm 246 secured against it. The relation of the prestressed spring arm 246 and of the backup plate 244 is shown in FIG. 18 before assembly, although following assembly the prestressed spring arm 246 is held flat against the backup plate 244 as may be seen in FIG. 16. The spring arm and backup plate are clamped against the shoulder on the rocker arm 50a by the nut 72a threaded on the reduced lower end of the rocker arm.

The backup plate 244 is provided with laterally extending ears, and tension springs 80a are stretched between these ears and anchor posts 247 secured on the inside of the top of the case. A bumper 248 also is secured on the inside of the case to limit the upper position of the spring 246 and backup member 244. Normally, the spring 246 remains against the backup member 244. However, there are instances wherein the follower roller 58a might move a rather substantial distance, much more than is necessary for actuating the switch, and the spring blade 246 then is capable of bending relatively upwardly away from the backup member to prevent damage to the switch mechanism.

The switch mechanism 92a is generally similar to that previously described. The switch mechanism differs in that upstanding flanges 250 are provided on top of the switch mechanism, and an operating lever 252 is pivotally connected between these flanges, and abuts the top of the switch operating button 90a. The operating lever 252 is provided at its free end with an upturned leg 254 having a button 256 thereon engaged by the spring 246. An abutment 258 is provided on top of the switch mechanism to limit downward movement of the operating lever 252, and hence to prevent undue movement of the internal parts of the switch mechanism. The normal quiescent position of the spring 246, the backup member 244, and the operating lever 252 is shown in full lines in FIG. 16. Dashed lines in this figure illustrate the manner in which the operating member can be moved against the stop or abutment 258, with the spring 246 thereafter flexing relatively upwardly away from the backup member 244.

The switch operating mechanism, similar to that previously described, comprises a plastic case 94a having a relatively low shelf 96a near one end thereof, and on which the switch blade 98a is secured, by means such as a rivet-like terminal 100a. The case slopes slightly downhill therefrom at 102a, having a central raised protuberance or hill 104a, to a floor 106a. A fixed switch contact 108a is mounted on the floor by means of a terminal 110a. A further, and relatively higher, shelf 112a is provided adjacent the opposite end of the case, and a second fixed switch contact 114a is mounted thereon by means of a terminal 116a.

It will be observed that both fixed contacts, including the fixed contact 108a, are higher than the shelf 96a. In accordance therewith, the switch blade 98a, which otherwise is substantially similar to the switch blade 98a previously described, is preflexed upwardly. A rigid sheet metal stamping 260 is secured by the terminal 100a on top of the central tongue 130a, and forms a limit stop overlying the support end of the tongue 130a to limit upward swinging movement of the tongue. As will be observed, the tongue extends beyond the rigid stamping 260, and the tip thereof is accordingly flexible, and this helps in overcentering the C-shaped spring 134a, this spring being substantially identical with that previously described.

The internal operation of the switch mechanism is substantially identical with that previously disclosed.

The bottom of the button 90a is generally saddle shaped, and hence engages the side arms of the spring blade 98a, while spanning the tongue 130a and the rigid stamping 260. It has been found in practice that the prestressed switch blade lasts substantially longer in service than one which is not preflexed. Damage to internal parts of the switch mechanism by unwanted movement of the external parts is avoided by the prestressed spring blade 246. The adjustable mounting of the external lever arm 56a allows a single basic switch to be adapted to a great variety of applications without modification.

The shape of the C-shaped spring and its cooperation with other parts in each example is believed to be unique. The C-shaped spring is stronger and easier to fabricate, and has longer life than any prior art springs with which I am familiar. In addition, it has an improved spring action due to the enlarged central portion and tapering end portions. The particular bellows arrangements shown and described afford a substantially leakproof seal for the housing or case, they are inexpensive to produce, and they are possessed of long life.

In each case, the spring bears against a part relatively near an anchor, as the parts having the recesses 132 and 152, which therefore is aptly termed a reaction member, and against a more remote part in the nature of a blade having a reaction portion, as the parts having the recesses 126 and 172.

It will be observed that the C-shaped spring is symmetrical. Accordingly, it can be inserted in either of two possible positions. This materially simplifies and speeds assembly.

It will be appreciated that the invention is not necessarily limited by the illustrations of the exemplary embodiments described, but includes variants within the scope of the invention as defined by the claims.

What is claimed as the invention is:

1. A switch mechanism comprising a reaction member having a notch therein, blade means anchored adjacent said reaction member and having a pair of spaced leg means each spaced from and extending past said reaction member to a reaction portion having a notch substantially confronting the notch in said reaction member, a bifurcated actuating means cooperable with each of said pair of leg means of said blade means to actuate said switch mechanism, and a substantially C-shaped spring acting between said reaction member and said blade means and having restricted portions received in said notches, said spring having a maximum width substantially at its mid-section and tapering toward the opposite ends to a minimum at said restricted portions and reversely tapering therefrom to enlargements of said restricted portions to limit endwise movement thereof in said notches, said spring acting as a dead center spring to snap said blade means back and forth relative to said reaction member.

2. A switch mechanism comprising a reaction means having notch means therein, blade means anchored adjacent said reaction means and having a pair of spaced leg means each spaced from and extending past said reaction means to a reaction portion means having a notch means substantially confronting the notch means in said reaction means, a bifurcated actuating means cooperable with each of said pair of leg means of said blade means to actuate said switch mechanism, and a substantially C-shaped spring means acting between said reaction means and said blade means and having restricted portion means received in each of said notch means, said spring means having a maximum width substantially at its mid-section and tapering toward the opposite ends to a minimum at said restricted portion means and reversely tapering therefrom to enlargements of said restricted portion means to limit endwise movement thereof in each of said notch means, said spring means acting as a dead center spring means for snapping said blade means back and forth relative to said reaction means.

3. The switch mechanism set forth in claim 2 wherein the reaction means and the blade means are integrally formed of one piece resilient sheet material to provide a movable contact means.

4. The switch mechanism set forth in claim 3 wherein the movable contact means is generally rectilinear in configuration and has a blanked out mid-portion to provide each of said notch means and a through aperture spaced from each of said notch means for anchoring said reaction means, there being a contact mounted on said contact means axially aligned with and spaced from said aperture and each of said notch means.

5. A switch mechanism comprising a one-piece rectilinear resilient sheet metal member having a tongue portion means to provide a reaction member having a notch therein, a blade means portion integral with and anchored adjacent said reaction member and having a pair of spaced leg means each spaced from and extending past said reaction member to a reaction portion having a notch substantially confronting the notch in said reaction member, a bifurcated actuating means cooperable with each of said pair of leg means of said blade means to actuate said switch mechanism, and a substantially C-shaped spring acting between said reaction member and said blade means and having restricted portions received in said notches, said spring having a maximum width substantially at its mid-section and tapering toward the opposite ends to a minimum at said restricted portions and reversely tapering therefrom to enlargements of said restricted portions to limit endwise movement thereof in said notches, said spring acting as a dead center spring to snap said blade means back and forth relative to said reaction member.

References Cited by the Examiner

UNITED STATES PATENTS 2,525,044 10/50 Puerner _____ 200—67
2,611,845 9/52 Miller _____ 200—67
2,776,347 1/57 Allen _____ 200—67

BERNARD A. GILHEANY, *Primary Examiner.*

ROBERT K. SCHAEFER, *Examiner.*